Sept. 1, 1936.   J. TJAARDA   2,052,732
INSTRUMENT PANEL
Original Filed Nov. 8, 1933

INVENTOR.
John Tjaarda.
BY
Dike, Calver & Gray
ATTORNEYS.

Patented Sept. 1, 1936

2,052,732

UNITED STATES PATENT OFFICE 2,052,732

INSTRUMENT PANEL

John Tjaarda, Birmingham, Mich., assignor to Briggs Manufacturing Company, Detroit, Mich., a corporation of Michigan Original application November 8, 1933, Serial No. 697,115. Divided and this application January 7, 1936, Serial No. 57,944

8 Claims. (Cl. 180—90)

This invention relates to automobile or vehicle bodies and more particularly to the instrument or front interior paneling thereof, an object of the invention being to provide an attractive and novel front or instrument panel having means mounted thereon adapted to provide a hand grip or handle bar whereby front seat passengers may assist themselves into and out of their seats.

A further object of the invention is to provide on the front finish or instrument paneling of the body a handle or grip bar or bars located within convenient reach of the front seat passengers when seated in the body as well as when entering or leaving the same, said bar or bars being positioned directly on a belt panel extending transversely below the windshield opening.

This application is a division of my co-pending application Serial No. 697,115, filed November 8, 1933.

Other objects and advantages of the invention will appear from the following description and appended claims when considered in connection with the accompanying drawing forming a part of this specification.

Figure 1:
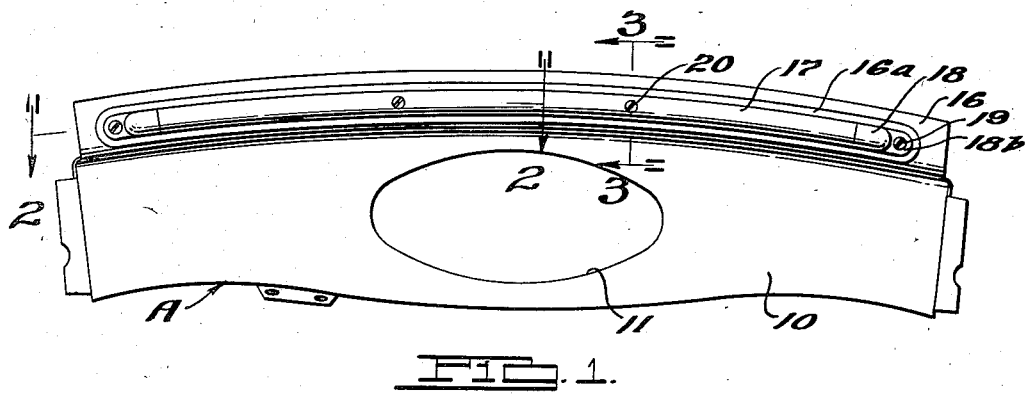
Fig. 1 is a front elevation of a form of instrument panel embodying my invention.
Figure 2:
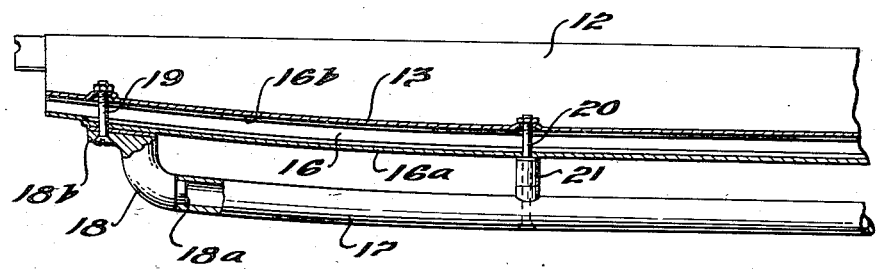
Fig. 2 is a horizontal section taken substantially along the line 2—2 of Fig. 1, looking in the direction of the arrows.
Figure 3:
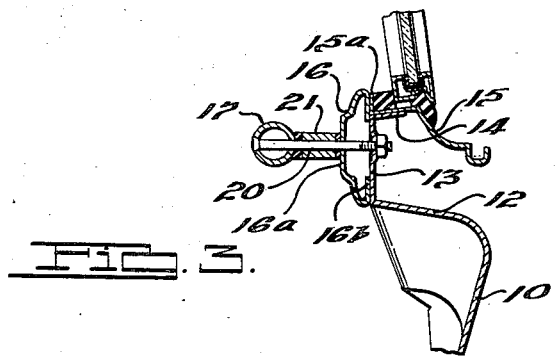
Fig. 3 is a vertical section taken substantially along the line 3—3 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the preferred embodiment of the invention, illustrated in the accompanying drawing, there is provided an instrument panel member A pressed out of sheet metal and adapted to extend across the front of the interior of an automobile body below the windshield and attached at opposite ends to the front pillars of the body. The lower part 10 of the panel, forming the instrument panel proper, contains an aperture 11 which is intended to receive the instruments used on an automobile and faces up slightly so that they may be more easily observed.

The intermediate part 12 of the instrument panel member A projects towards the interior of the body and carries a vertical upper portion 13 extending across the body and having a flange 14 at the top adapted to be secured, as by spot welding, to a cowl member 15. The vertical portion 13 of the instrument panel member and the flanged edge 15a of the cowl member 15 are covered by a metal finish strip or molding piece 16 which extends from one side of the body to the other just in back of and below the windshield. The face of the molding piece 16 is provided with inturned flanges 16b which fit against the vertical portion 13 of the instrument panel member and the flange 15a of the cowl member and also with a raised panel 16a which forms a seat for mounting the handle bar 17.

The handle bar 17 is a hollow tube which is parallel to and spaced out from the raised panel 16a. The ends of the handle bar are secured to the instrument panel member A by means of curved brackets 18 having inner ends 18a which fit up against and into the ends of the handle bar 17 and the outer ends 18b which fit flat against the surface of the raised panel 16a. Bolts 19 extend through the flat outer ends 18b of the brackets, through the molding piece 16, and the vertical portion 13 of the instrument panel member to secure the members together. The intermediate portion of the handle bar 17 is secured to the molding panel 16 by means of bolts 20 extending through the handle bar, through spacer blocks 21, and through the molding piece 16 and the vertical portion 13 of the instrument panel member A, thus not only securing the handle bar but also the molding piece to the instrument panel member.

From the above description it will be seen that I have provided an instrument panel with a portion projecting towards the passengers of the car and carrying a handle bar in a position where it can be easily grasped by a person getting into or out of the car.

I claim:

1. An instrument panel assembly for a motor vehicle, comprising a panel formed from a sheet metal stamping, said panel having an opening formed therein for receiving instruments, a molding attached to said panel and extending across the face thereof adjacent the top of said panel, and a handle bar attached to said molding and having a gripping portion spaced therefrom.

2. An instrument panel assembly for a motor vehicle comprising a metal panel having an intermediate portion projecting out over the lower portion and carrying an upright upper portion, a finish strip extending across the face of the upright upper portion, a hand grip or handle bar attached at opposite ends to the finish strip and having a gripping portion spaced from the finish strip, and common means for securing the handle bar and the finish strip to the upright portion of the instrument panel member.

3. A motor vehicle instrument panel assembly comprising an upright lower panel portion adapted to receive instruments, an intermediate panel portion projecting from the lower panel portion, an upright upper panel portion carried by said projecting panel portion, and a single handle bar spaced from and supported by the upright upper panel portion and extending substantially from one end of the instrument panel assembly to the other.

4. A motor vehicle instrument panel assembly comprising an upright lower panel portion adapted to receive instruments, an intermediate panel portion projecting from the lower panel portion, an upright upper panel portion carried by said projecting panel portion, and a single handle bar spaced from and supported by the upright upper panel portion and extending substantially from one end of the instrument panel assembly to the other, the handle bar being secured to the upper panel portion at each end and at one or more intermediate points.

5. In a motor vehicle instrument panel assembly, an instrument panel member, a cowl member secured thereto, a molding piece covering the joint between said members, a handle bar, a spacing member between the handle bar and the molding piece, and fastening means extending from the handle bar through the spacing member to one of the two first mentioned members.

6. In a motor vehicle instrument panel assembly, an instrument panel member, a cowl member secured thereto, a molding piece covering the joint between said members, a handle bar adjacent to but spaced from the molding piece, a spacing member between the handle bar and the molding piece, and fastening means extending from the handle bar through the spacing member to the instrument panel member.

7. In a motor vehicle instrument panel assembly, an instrument panel member, a molding piece covering a portion of the instrument panel member, a handle bar parallel to and adjacent to but spaced from the molding piece, and brackets bolted through the molding piece to the instrument panel member, the brackets carrying the ends of the handle bar.

8. In a motor vehicle instrument panel assembly, an instrument panel member, a cowl member secured thereto, a molding piece covering the joint between said members, a handle bar parallel to and adjacent to but spaced from the molding piece, brackets carrying the ends of the handle bar and bolted through the molding piece to one of the two first mentioned members, a spacing member between the intermediate portion of the handle bar and the molding piece, and fastening means extending from the handle bar through the spacing member to the instrument panel member.

JOHN TJAARDA.